United States Patent
Gitzel

(10) Patent No.: US 12,548,139 B2
(45) Date of Patent: Feb. 10, 2026

(54) SYSTEM FOR MONITORING A SWITCHGEAR

(71) Applicant: ABB Schweiz AG, Baden (CH)

(72) Inventor: Ralf Gitzel, Mannheim (DE)

(73) Assignee: ABB Schweiz AG, Baden (CH)

( * ) Notice: Subject to any disclaimer, the term of this patent is extended or adjusted under 35 U.S.C. 154(b) by 349 days.

(21) Appl. No.: 18/303,645

(22) Filed: Apr. 20, 2023

(65) Prior Publication Data

US 2023/0342906 A1 Oct. 26, 2023

(30) Foreign Application Priority Data

Apr. 21, 2022 (EP) .................................. 22169229

(51) Int. Cl.
*G06T 7/00* (2017.01)
*G06T 5/50* (2006.01)
*G06T 7/136* (2017.01)

(52) U.S. Cl.
CPC .............. *G06T 7/0004* (2013.01); *G06T 5/50* (2013.01); *G06T 7/136* (2017.01); *G06T 2207/10048* (2013.01)

(58) Field of Classification Search
CPC ......... G06T 2207/10048; G06T 7/0004; G06T 2207/30164; G06T 2207/20084; G06T 5/50; G06T 7/136; G06T 2207/20221; G06T 2207/30108; G06T 7/0008; G06V 10/56; G06V 10/82
See application file for complete search history.

(56) References Cited

U.S. PATENT DOCUMENTS

| | | | |
|---|---|---|---|
| 12,044,576 B2* | 7/2024 | Gitzel | ..................... G06T 7/136 |
| 2010/0260374 A1* | 10/2010 | Akashi | .................. G06T 7/0004 |
| | | | 382/100 |
| 2019/0026875 A1* | 1/2019 | Yuan | ......................... G06T 5/50 |

(Continued)

FOREIGN PATENT DOCUMENTS

| | | |
|---|---|---|
| EP | 3716205 A1 | 9/2020 |
| EP | 3786598 A1 | 3/2021 |
| KR | 10-2295188 B1 | 8/2021 |

OTHER PUBLICATIONS

Gitzel et al., "Automatic Analysis of Thermograms—Challenge in Thermal Monitoring of Switchgears Using Infrared Cameras," *CIRED 2021—26th International Conference and Exhibition on Electricity Distribution*, 5 pp. (Sep. 20-23, 2021).

(Continued)

*Primary Examiner* — Li Liu
(74) *Attorney, Agent, or Firm* — Fitch Even Tabin & Flannery LLP

(57) ABSTRACT

A system for monitoring a switchgear includes an infrared camera; a processing unit; and an output unit. The camera acquires a first infrared image. The processing unit determines a pixel in the first image with a maximum temperature and uses a second number of pixels to determine a temperature interval. The processing unit sorts the pixels in descending order of temperature to determine a threshold temperature and determines that a hot spot exists in the switchgear using the temperature interval for the first infrared image. The output unit is configured to output an indication of a fault in the switchgear when the determination has been made that a hot spot exists in the switchgear.

20 Claims, 4 Drawing Sheets

(56) References Cited

U.S. PATENT DOCUMENTS

2021/0065357 A1\*  3/2021  Gitzel .................... H04N 7/18
2023/0228625 A1\*  7/2023  Gitzel ................. G01J 5/0096
                                                      374/121

OTHER PUBLICATIONS

Yan et al., "A Real-Time IR-Fusion Switchgear Contact Monitoring System (SCMS)," *IEEE Access*, 5(2017): 12114-12124 (May 25, 2017).

European Patent Office, Extended European Search Report in European Patent Application No. 22169229.6, 9 pp. (Jun. 29, 2022).

\* cited by examiner

SYSTEM FOR MONITORING A SWITCHGEAR

CROSS-REFERENCE TO RELATED APPLICATIONS

This patent application claims priority to European Patent Application No. 22169229.6, filed on Apr. 21, 2022, which is incorporated herein in its entirety by reference.

FIELD OF THE DISCLOSURE

The present disclosure generally relates to a system for monitoring a switchgear, a method for monitoring a switchgear, to a switchgear having such a system, and a computer program element.

BACKGROUND OF THE INVENTION

Electrical equipment such as switchgear can suffer from small faults that change the electrical resistance of the system. These faults manifest as hot spots and can ultimately lead to catastrophic failures. Here a switchgear can be a high voltage, medium voltage, or low voltage switchgear.

One solution is to monitor parts of the switchgear, such as the phases, with an infrared thermographic camera to detect the hot spots. This is because infrared (IR) images can be used to identify technical problems within electrical equipment (e.g., switchgear) that lead to the overheating of components and to identify the hot spots themselves.

However, while a human is quite capable of recognizing hot spots from infrared images, monitoring 24 hours a day every day is required meaning that an automated system is required, and it is not simple for an automated system to determine from infrared imagery whether there is a hot spot.

BRIEF SUMMARY OF THE INVENTION

The present disclosure describes an improved system for monitoring a switchgear, which is described with respect to a switchgear, but finds utility in other electrical system than can suffer from components that overheat.

In an aspect, there is provided a system for monitoring a switchgear. The system comprises:

an infrared camera;
a processing unit; and
an output unit.

In one embodiment, the infrared camera is configured to acquire a first infrared image of the switchgear, and a total number of pixels in the first infrared image is equal to a first number. The processing unit is configured to determine a pixel in the first infrared image with a maximum temperature in the first infrared image. The processing unit is configured to utilize a second number of pixels less than the first number of pixels to determine a temperature interval for the first infrared image equal to a difference between the maximum temperature in the first infrared image and a threshold temperature in the first infrared image.

The processing unit is configured to sort the pixels in the infrared image in descending order of temperature from the maximum temperature and determine the threshold temperature in the first infrared image as a temperature of a pixel in the first infrared image that is the pixel placed a set number in the sorted order of pixels in the descending order of temperature from the maximum temperature, and the set number is equal to the second number of pixels. The processing unit is configured to determine that a hot spot exists in the switchgear. The determination that the hot spot exists comprises utilization of the temperature interval for the first infrared image. The output unit is configured to output an indication of a fault in the switchgear when the determination has been made that a hot spot exists in the switchgear.

In other words, infrared imagery of a switchgear is acquired, for example of the three phases. Each image could have 1024 pixels. A number such as 300 is selected. Then an image is analysed to determine the maximum or hottest temperature in an image. For example, this could be 60.5 C. Then the pixels are sorted in decreasing order of temperature. The pixel 300 from the maximum temperature in the descending list of pixel temperatures is identified. This for example could have a temperature of 51.5 C. The temperature interval is then 60.5 C minus 51.5 C equal to 9 C. And this temperature interval can be used to determine if there is a hot spot in the image. A temperature span of for example current carrying phases of a switchgear can indicate whether there is a hotspot, without requiring a detailed understanding of the image structure.

In this manner, the new temperature monitoring system can be used to determine whether there are hot spots in the image that indicate faults in the switchgear system.

Thus, for the above example the temperature interval of 9 C can be associated with a correctly functioning switchgear with no hot spots. However, later, if a hot spot develops, the maximum temperature is again identified and the pixels are again sorted in descending order of temperature, and the pixel 300 from the top again identified and its temperature identified to determine a new temperature interval. If there is a hot spot, then the temperature interval will be greater than 9 C and this can be used to determine that there is a hot spot.

Also, a minimum amount of camera system configuration is required with respect to implementing such a switchgear monitoring system.

DETAILED DESCRIPTION OF THE INVENTION

Figure 1:
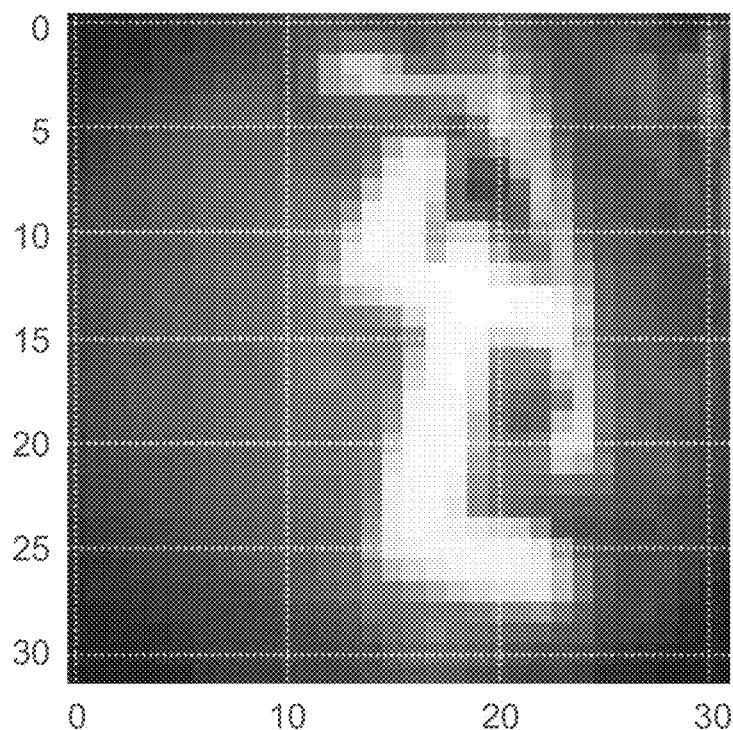
FIG. 1 is an exemplary infrared image of a switchgear in accordance with the disclosure.

FIGS. 1-7 provide details explaining a new system for monitoring a switchgear. The system comprises an infrared camera, a processing unit, and an output unit. The infrared camera is configured to acquire a first infrared image of the switchgear, and a total number of pixels in the first infrared image is equal to a first number. The processing unit is configured to determine a pixel in the first infrared image with a maximum temperature in the first infrared image. The processing unit is configured to utilize a second number of pixels less than the first number of pixels to determine a temperature interval for the first infrared image equal to a difference between the maximum temperature in the first infrared image and a threshold temperature in the first infrared image.

The processing unit is configured to sort the pixels in the infrared image in descending order of temperature from the maximum temperature and determine the threshold temperature in the first infrared image as a temperature of a pixel in the first infrared image that is the pixel placed a set number in the sorted order of pixels in the descending order of temperature from the maximum temperature. The set number is equal to the second number of pixels. The processing unit is configured to determine that a hot spot exists in the switchgear. The determination that the hot spot exists comprises utilization of the temperature interval for the first infrared image. The output unit is configured to output an indication of a fault in the switchgear when the determination has been made that a hot spot exists in the switchgear.

In an example, the second number is determined from an infrared image captured by the infrared camera, or an equivalent infrared camera, of the switchgear, or an equivalent switchgear, such that the second number is a number of pixels in the infrared image that have the highest temperature values and that cover the parts of the switchgear, such as the phases or parts of the phases, that are required to be monitored. In other words, a correctly functioning switchgear can be imaged, and the number of the hottest pixels varied until the associated parts of the image cover the parts of the switchgear required to be monitored. This then sets the second number (say X) and is then used to identify the hottest X pixels in subsequent images and the temperature threshold which along with the maximum temperature provides the associated temperature interval that is used to indicate if there is a hot spot or not.

According to an example, the second number is a predetermined number, and in another embodiment the second number may be determined from one or more calibration infrared images of the, or a similar, switchgear.

According to an example, the determination that the hot spot exists comprises utilization of the maximum temperature in the first infrared image, and in another example the determination that the hot spot exists comprises a determination that the temperature interval for the first infrared image is greater than a threshold temperature interval value.

According to an example, the threshold temperature interval value is determined as a function of the maximum temperature in the first infrared image.

According to an example, the infrared camera is configured to acquire a second infrared image of the switchgear after acquisition of the first infrared image of the switchgear, and a total number of pixels in the second infrared image is equal to the first number. The processing unit is configured to determine a pixel in the second infrared image with a maximum temperature in the second infrared image. The processing unit is configured to utilize the second number of pixels to determine a temperature interval for the second infrared image equal to a difference between the maximum temperature in the second infrared image and a threshold temperature in the second infrared image. The processing unit is configured to sort the pixels in the second infrared image in descending order of temperature from the maximum temperature in the second infrared image and determine the threshold temperature in the second infrared image as a temperature of a pixel in the second infrared image that is the pixel placed the set number in the sorted order of pixels in the descending order of temperature from the maximum temperature. The processing unit is configured to determine that the hot spot exists in the switchgear on the basis that the temperature interval for the second infrared image is greater than the temperature interval for the first infrared image.

In an example, the processing unit is configured to determine that the hot spot exists in the switchgear on the basis that the temperature interval for the second infrared image is greater than the temperature interval for the first infrared image by a set amount, which can be one of 0.5, 1, 1.5 . . . 3 deg. C. In an example, the set amount is determined as a function of the maximum temperature.

The infrared camera may be configured to acquire a plurality of infrared images of the switchgear after acquisition of the first infrared image of the switchgear, and a total number of pixels in each of the plurality of infrared images is equal to the first number. The processing unit is configured to determine a pixel in each of plurality of infrareds image with a maximum temperature in the each of the plurality of infrared images. The processing unit is configured to utilize the second number of pixels to determine a temperature interval for each of the plurality of infrared images equal to a difference between the maximum temperature in the each of the plurality of infrared images and a threshold temperature in each of the plurality of infrared images. The processing unit is configured to sort the pixels in each of the plurality of infrared images in descending order of temperature from the maximum temperature in each of the plurality of infrared images and determine the threshold temperature in each of the plurality of infrared images as a temperature of a pixel in each of the plurality of infrared images that is the pixel placed the set number in the sorted order of pixels in the descending order of temperature from the maximum temperature. The processing unit is configured to determine that the hot spot exists in the switchgear on the basis of a rate of change between adjacent temperature intervals of the temperature interval for the first infrared image and the temperature intervals for the plurality of infrared images.

The determination that the hot spot exists may include utilization of a machine learning algorithm, which may be a trained neural network.

According to an example, the system comprises a visible camera configured to acquire a visible image of the switchgear. The processing unit is configured to overlay a location of a maximum temperature in an infrared image onto a corresponding location in the visible image.

According to an example, the processing unit is configured to overlay locations of pixels having a temperature between a threshold temperature and the maximum temperature in an infrared image onto corresponding locations in the visible image.

It is clear from the above a switchgear can comprising such a system as described above, whether retrofitted to an existing switchgear, or provided with a switchgear as it is built.

Also, it is clear that an associated method for monitoring a switchgear comprises:

acquiring by an infrared camera a first infrared image of the switchgear, wherein a total number of pixels in the first infrared image is equal to a first number;

determining by a processing unit a pixel in the first infrared image with a maximum temperature in the first infrared image;

utilizing by the processing unit a second number of pixels less than the first number of pixels to determine a temperature interval for the first infrared image equal to a difference between the maximum temperature in the first infrared image and a threshold temperature in the first infrared image;

sorting by the processing unit the pixels in the infrared image in descending order of temperature from the maximum temperature and determining the threshold temperature in the first infrared image as a temperature of a pixel in the first infrared image that is the pixel placed a set number in the sorted order of pixels in the descending order of temperature from the maximum temperature, and wherein the set number is equal to the second number of pixels;

determining by the processing unit that a hot spot exists in the switchgear, wherein the determining that the hot spot exists comprises utilizing the temperature interval for the first infrared image; and outputting by an output unit an indication of a fault in the switchgear when the determination has been made that a hot spot exists in the switchgear.

In an example, the second number is a predetermined number, or it may be determined from one or more calibration infrared images of the, or a similar, switchgear.

In an example, the determining that the hot spot exists comprises utilizing the maximum temperature in the first infrared image.

In an example, the determining that the hot spot exists comprises determining that the temperature interval for the first infrared image is greater than a threshold temperature interval value.

In an example, the threshold temperature interval value is determined as a function of the maximum temperature in the first infrared image.

In an example, the method comprises:

acquiring by the infrared camera a second infrared image of the switchgear after acquisition of the first infrared image of the switchgear, wherein a total number of pixels in the second infrared image is equal to the first number;

determining by the processing unit a pixel in the second infrared image with a maximum temperature in the second infrared image;

utilizing by the processing unit the second number of pixels to determine a temperature interval for the second infrared image equal to a difference between the maximum temperature in the second infrared image and a threshold temperature in the second infrared image;

sorting by the processing unit the pixels in the second infrared image in descending order of temperature from the maximum temperature in the second infrared image and determining the threshold temperature in the second infrared image as a temperature of a pixel in the second infrared image that is the pixel placed the set number in the sorted order of pixels in the descending order of temperature from the maximum temperature; and determining by the processing unit that the hot spot exists in the switchgear on the basis that the temperature interval for the second infrared image is greater than the temperature interval for the first infrared image.

In an example, method comprises:

acquiring by the infrared camera a plurality infrared images of the switchgear after acquisition of the first infrared image of the switchgear, wherein a total number of pixels in each of the plurality of infrared images is equal to the first number;

determining by the processing unit a pixel in each of plurality of infrareds image with a maximum temperature in the each of the plurality of infrared images;

utilizing by the processing unit the second number of pixels to determine a temperature interval for each of the plurality of infrared images equal to a difference between the maximum temperature in the each of the plurality of infrared images and a threshold temperature in each of the plurality of infrared images;

sorting by the processing unit the pixels in each of the plurality of infrared images in descending order of temperature from the maximum temperature in each of the plurality of infrared images and determining the threshold temperature in each of the plurality of infrared images as a temperature of a pixel in each of the plurality of infrared images that is the pixel placed the set number in the sorted order of pixels in the descending order of temperature from the maximum temperature;

determining by the processing unit that the hot spot exists in the switchgear on the basis of a rate of change between adjacent temperature intervals of the temperature interval for the first infrared image and the temperature intervals for the plurality of infrared images.

In an example, the determining that the hot spot exists comprises utilizing a machine learning algorithm.

In an example, the machine learning algorithm is a trained neural network.

In an example, the method comprises acquiring by a visible camera a visible image of the switchgear, and overlaying by the processing unit a location of a maximum temperature in an infrared image onto a corresponding location in the visible image.

In an example, the method comprises overlaying by the processing unit locations of pixels having a temperature between a threshold temperature and the maximum temperature in an infrared image onto corresponding locations in the visible image.

Continuing with the figures, the system and method for monitoring a switchgear is described in further detail, with respect to specific embodiments.

It is to be noted, that the basis for the new system and method for monitoring a switchgear is based around a new algorithm that is termed an fast variant inverse pixel count algorithm.

An infrared thermographic (IRT) image is essentially a matrix of temperature values or a grayscale image. An example is shown in FIG. 1. The image shows the phases of a medium-voltage switchgear which heat up because current is flowing through them. The same applies to a high-voltage switchgear and to a low-voltage switchgear.

Figure 2:
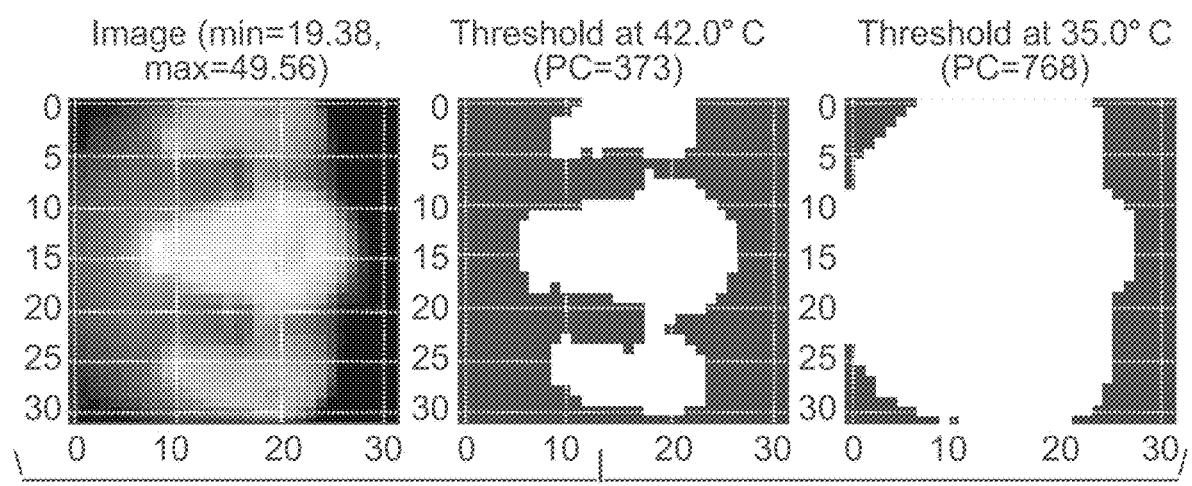
FIG. 2 is an exemplary infrared image of a switchgear and examples of two different thresholds being applied to the infrared image, in accordance with the disclosure.

By applying a threshold to the image, the image can be separated into two regions—a region where the temperature is above the threshold (t) and the region where it is below t. In FIG. 2, an IRT image from another switchgear compartment is shown where the maximum temperature is about 50° C. The image in the middle shows the result of applying a threshold of 42° C. All pixels hotter than or as hot as that are marked white, anything else is marked black. In the image on the right, a threshold of 35° C. is used. The lower the threshold, the more pixels will be included. Thus FIG. 2 in effect shows the effects of applying a threshold.

In the example of FIG. 2, there is a relatively clear distinction between an object (the phases, which are heated by Joule heating) and the background in the IRT image on the left. A threshold of about 42° C. (ca 8K below the maximum temperature) roughly reproduces the phases while removing the background (see middle image). When the phase is fully visible, the number of pixels above the threshold is 373 in this example. (This value is called the pixel count.) The lower threshold on the right has a higher pixel count—768.

The threshold used to obtain the "proper" middle image in FIG. 2 can be used to compute the temperature difference in the phase region. In the example, the temperature in the phases ranges from 42 to almost 50° C., so the temperature interval is 8K.

When the same thresholds are applied to an image with a hot spot but roughly the same maximum temperature (FIG. 3, left), the pixel count will be lower for an image with the same maximum temperature and the same threshold levels. The reason is that a bigger temperature interval would be needed to include all phases because the hot spot by definition has a higher temperature than the other phases. In other words, as a hot spot spike in temperature starts to occur this maximum temperature becomes more separated from the temperatures of the other parts of the switchgear such that the number of pixels within a fixed threshold of the maximum become ever smaller as the hot spot increases in temperature. If for the same maximum temperature and the same temperature interval the pixel count is lower, there is a hot spot.

However, it was realized that for the new system a temperature interval need not be defined. Thus, in the new fast variant inverse pixel count algorithm there is no definition of a temperature interval and a counting of the pixels. Rather in the fast variant inverse pixel count algorithm a threshold temperature is determined by sorting all the pixels in descending order of temperature from a maximum temperature and a fixed number of pixels is chosen and the pixel that sits this fixed number in the sorted list of pixels from the maximum temperature defines a threshold temperature, and the difference between the maximum temperature and this threshold temperature provides the temperature interval.

Figure 3:
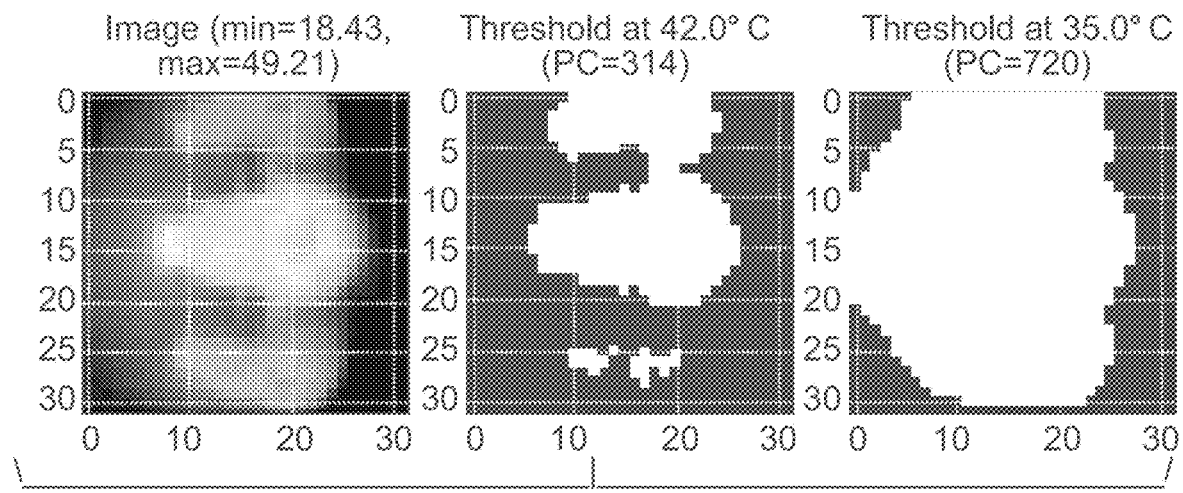
FIG. 3 is an exemplary infrared image of a switchgear with a hot spot and examples of the two different thresholds that were applied with respect to FIG. 2, now applied to the infrared image with the hot spot.
Figure 4:
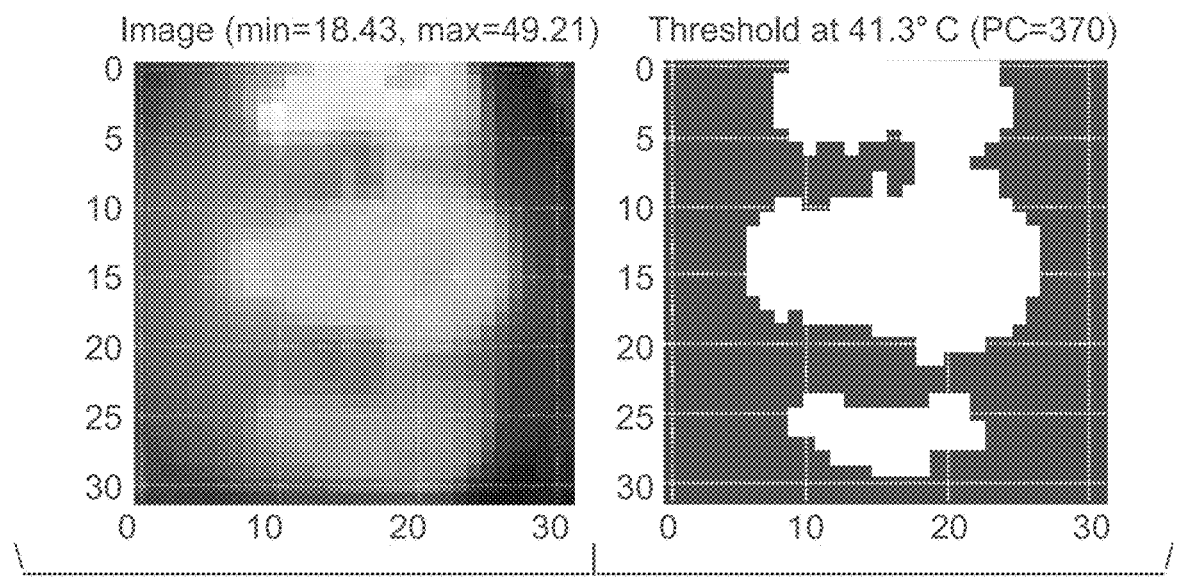
FIG. 4 is an exemplary infrared image of a switchgear with a hot spot as shown in FIG. 3 and an example of a threshold being applied that shows the three phases in a similar manner to that shown in FIG. 2 for a healthy switchgear.
Figure 5:
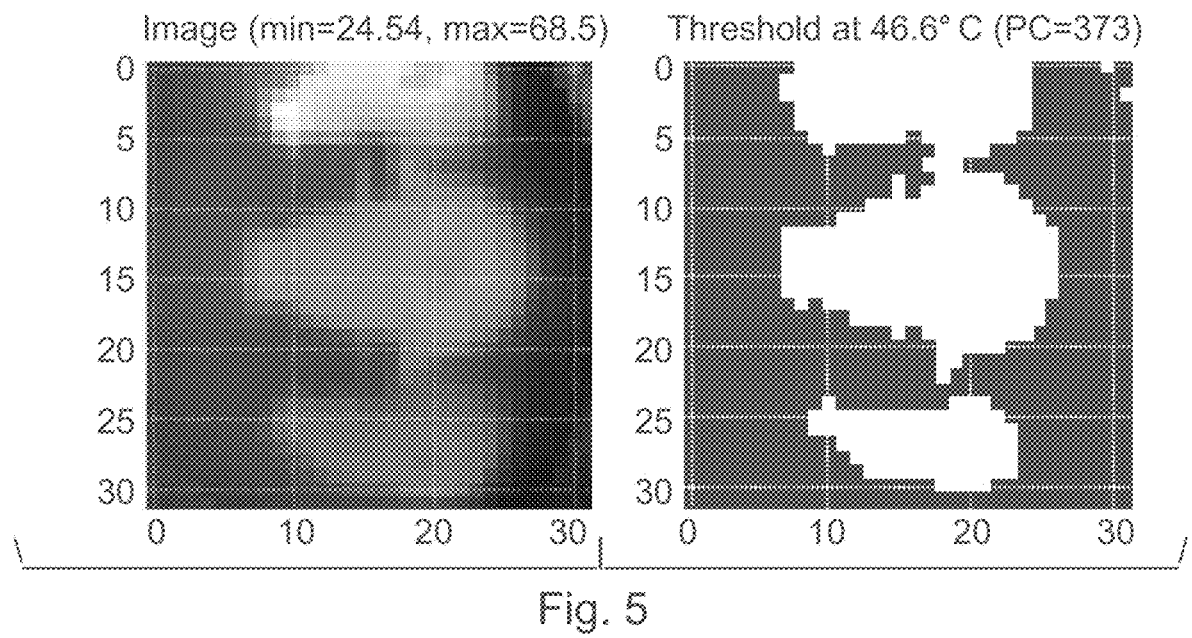
FIG. 5 shows the exemplary infrared image of a switchgear with a hot spot as shown in FIG. 3, but that has increased in intensity, and an example of a threshold being applied that shows the three phases in a similar manner to the that shown in FIG. 2 for a healthy switchgear.

In FIG. 4, which shows the same hot spot image as FIG. 3, the pixels count (the number of pixels below the maximum temperature in the sorted list of pixels), and its associated threshold temperature, has been chosen such that the pixel count is as close to the value that fully shows all three phases. The image looks similar to the middle one in FIG. 2, which shows a healthy image.

The main difference, however, is that the temperature interval is slightly larger (9K vs 8K). As the hot spot grows in intensity, so does the required interval, which goes up to 21K in FIG. 5. Thus, the size of the interval can be used to classify faulty and healthy cases. If the temperature interval at the fixed pixel count is low, the temperature of the phases is homogeneous. If the interval is high, there is a hot spot.

Figure 6:
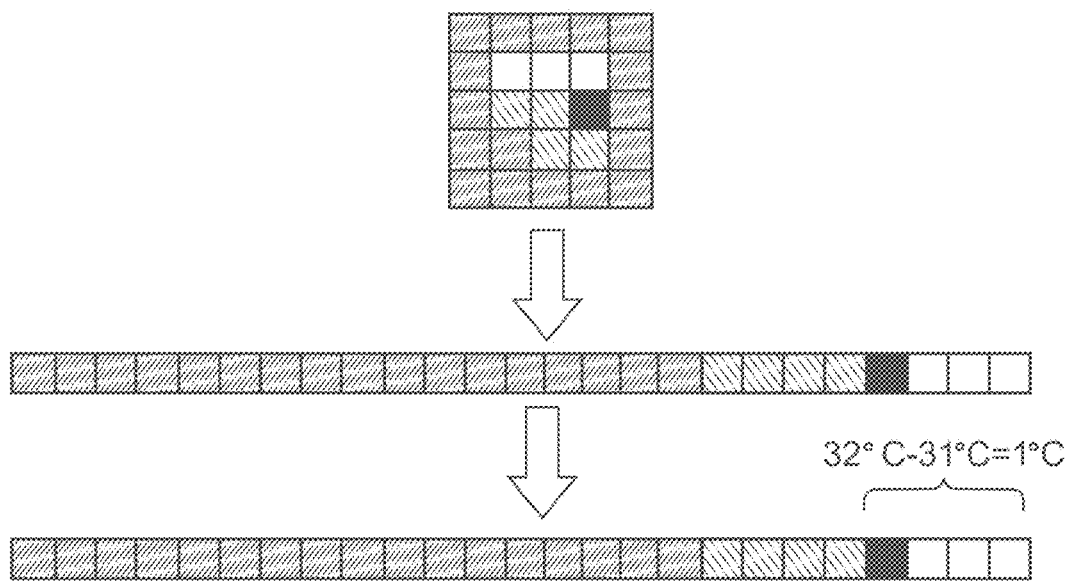
FIG. 6 shows an example of pixels of an infrared image being sorted by temperature and the threshold temperature being determined, in accordance with the disclosure.

FIG. 6 shows a representation of how the fast variant inverse pixel count algorithm operates. An infrared image is shown at the top. The pixels have different temperatures. The pixels are sorted in decreasing temperatures, with the maximum temperature at the right-hand side, which in this case is 32 C. In this example case the infrared image only has 25 pixels, which is less than a real image and is being used for this example for simplicity. A number, in this case 4, is chosen. The temperature of the fourth pixel from the maximum temperature in the sorted list is identified. This is the temperature threshold, and in this case, this is 31 C. Then the temperature interval is 1 C. For all subsequent images, the pixels are again ordered in decreasing temperatures, and the maximum temperature identified and the temperature of the fourth pixel down in the list identified, with the difference being the temperature interval. If this temperature interval suddenly increases, then a hot spot is developing, and a warning can be indicated.

In the above example, there were only 25 pixels and the fourth pixel down from the maximum in the sorted list was used to determine the threshold temperature. In a real infrared image with for example 1024 pixels, the threshold temperature could be a fixed number such as 50, 100, 150, 200 etc. A determination of this number can be made by gradually selecting more of an image in terms of the hottest pixels until all of the relevant parts of the switchgear that are required to be monitored are selected. This number of pixels is then the number to be used in counting down from the hottest pixel in the sorted list of pixels to identify the threshold temperature in this image, which along with the maximum temperature provides the temperature interval. This same number is then used to count down in the list of sorted temperature pixels in subsequent infrared images to determine the temperature threshold for that image, which along with the maximum temperature for that image provides the temperature interval used to determine if there is a hot spot.

Figure 7:
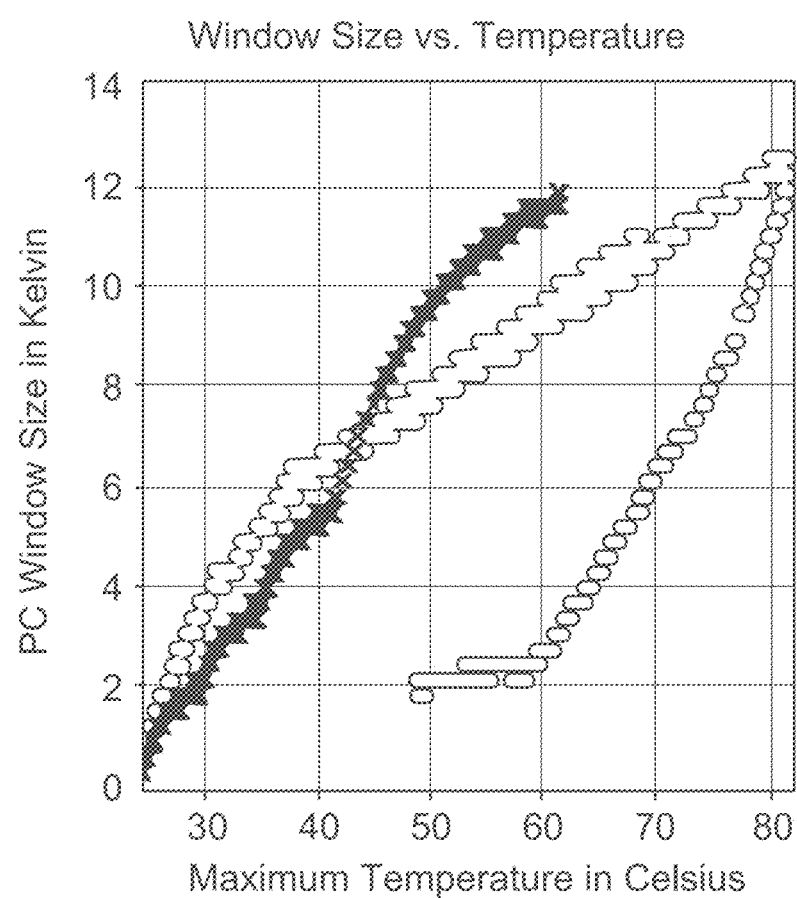
FIG. 7 is a combined plot of maximum temperature against temperature interval for a healthy switchgear and for a switchgear with a developing hot spot.

The fast variant inverse pixel count algorithm can be used to distinguish faulty and healthy cases as can be seen in FIG. 7. A simple algorithm would use a line to separate healthy and faulty above a temperature of 45° C., where every interval above the line would be classified as faulty and anything below as healthy. In FIG. 7 it can be seen that above around 45 C in one case of increasing maximum temperature the temperature interval diverges upwards, above the generally monotonically increasing case for a healthy switchgear, thereby indicating that there is a hotspot. More complex algorithms can apply different rules at different temperatures. The interval size can also be used as one of several machine learning features including for example maximum image temperature, and derivatives of the maximum temperature and derivatives of the temperature interval.

In another exemplary embodiment, a computer program or computer program element is provided that is characterized by being configured to execute the method steps of the method according to one of the preceding embodiments, on an appropriate processor or system.

The computer program element might therefore be stored on a computer unit, which might also be part of an embodiment. This computing unit may be configured to perform or induce performing of the steps of the method described above. Moreover, it may be configured to operate the components of the above-described system. The computing unit can be configured to operate automatically and/or to execute the orders of a user. A computer program may be loaded into a working memory of a data processor. The data processor may thus be equipped to carry out the method according to one of the preceding embodiments.

This exemplary embodiment of the invention covers both, a computer program that right from the beginning uses the invention and computer program that by means of an update turns an existing program into a program that uses the invention.

Further on, the computer program element might be able to provide all necessary steps to fulfill the procedure of an exemplary embodiment of the method as described above.

According to a further exemplary embodiment of the present invention, a computer readable medium, such as a CD-ROM, USB stick or the like, is presented wherein the computer readable medium has a computer program element stored on it which computer program element is described by the preceding section.

A computer program may be stored and/or distributed on a suitable medium, such as an optical storage medium or a solid-state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

According to an example, the second number is a predetermined number.

According to an example, the second number is determined from one or more calibration infrared images of the, or a similar, switchgear.

According to an example, the determination that the hot spot exists comprises utilization of the maximum temperature in the first infrared image.

In this way, as the switchgear heats up a maximum temperature will gradually increase and for each maximum temperature it can be known what the temperature interval should be for a switchgear with no hot spots. Then, if for a maximum temperature the temperature interval is above that anticipated, it can be determined that there is a hot spot. Thus, it is not required to know whether the maximum temperature is normal or not, for example that would require to know at what time point in a heat-up stage the switchgear was, simply an indication that the temperature interval is above that anticipated for that maximum temperature is enough to indicate that there is a hotspot.

According to an example, the determination that the hot spot exists comprises a determination that the temperature interval for the first infrared image is greater than a threshold temperature interval value.

According to an example, the threshold temperature interval value is determined as a function of the maximum temperature in the first infrared image.

According to an example, the infrared camera is configured to acquire a second infrared image of the switchgear after acquisition of the first infrared image of the switchgear, and a total number of pixels in the second infrared image is equal to the first number. The processing unit is configured to determine a pixel in the second infrared image with a maximum temperature in the second infrared image. The processing unit is configured to utilize the second number of pixels to determine a temperature interval for the second infrared image equal to a difference between the maximum temperature in the second infrared image and a threshold temperature in the second infrared image. The processing unit is configured to sort the pixels in the second infrared image in descending order of temperature from the maximum temperature in the second infrared image and determine the threshold temperature in the second infrared image as a temperature of a pixel in the second infrared image that is the pixel placed the set number in the sorted order of pixels in the descending order of temperature from the maximum temperature. The processing unit is configured to determine that the hot spot exists in the switchgear on the basis that the temperature interval for the second infrared image is greater than the temperature interval for the first infrared image.

Thus, for example, in operation in a steady state with constant current that should result in a constant maximum temperature or pseudo steady state with slight variations in current that can lead to variations in the maximum temperature, by monitoring the temperature interval between images it can be determined that there is a hotspot developing without. A hot spot can be identified, and an alarm raised, whilst at the same time an increase in maximum temperature for a healthy system due to increased current can be identified as such because the temperature interval has either not increased or has not increased by a required amount to indicate that there is a hot spot.

In an example, the processing unit is configured to determine that the hot spot exists in the switchgear on the basis that the temperature interval for the second infrared image is greater than the temperature interval for the first infrared image by a set amount.

In an example, the set amount is 0.5 C, 1 C, 1.5 C . . . 3 C.

In an example, the set amount is determined as a function of the maximum temperature.

According to an example, the infrared camera is configured to acquire a plurality of infrared images of the switchgear after acquisition of the first infrared image of the switchgear, and a total number of pixels in each of the plurality of infrared images is equal to the first number. The processing unit is configured to determine a pixel in each of plurality of infrareds image with a maximum temperature in the each of the plurality of infrared images. The processing unit is configured to utilize the second number of pixels to determine a temperature interval for each of the plurality of infrared images equal to a difference between the maximum temperature in the each of the plurality of infrared images and a threshold temperature in each of the plurality of infrared images. The processing unit is configured to sort the pixels in each of the plurality of infrared images in descending order of temperature from the maximum temperature in each of the plurality of infrared images and determine the threshold temperature in each of the plurality of infrared images as a temperature of a pixel in each of the plurality of infrared images that is the pixel placed the set number in the sorted order of pixels in the descending order of temperature from the maximum temperature. The processing unit is configured to determine that the hot spot exists in the switchgear on the basis of a rate of change between adjacent temperature intervals of the temperature interval for the first infrared image and the temperature intervals for the plurality of infrared images.

According to an example, the determination that the hot spot exists comprises utilization of a machine learning algorithm.

According to an example, the machine learning algorithm is a trained neural network.

According to an example, the system comprises a visible camera configured to acquire a visible image of the switchgear. The processing unit is configured to overlay a location of a maximum temperature in an infrared image onto a corresponding location in the visible image.

According to an example, the processing unit is configured to overlay locations of pixels having a temperature between a threshold temperature and the maximum temperature in an infrared image onto corresponding locations in the visible image.

In other words, the location of hot pixels can be mapped to a visible image in order to allow a human to review the situation to determine if there is a fault.

In a second aspect, there is provided a switchgear comprising a system according to the first aspect.

In a third aspect, there is provided a method for monitoring a switchgear. The method comprises:

acquiring by an infrared camera a first infrared image of the switchgear, wherein a total number of pixels in the first infrared image is equal to a first number;

determining by a processing unit a pixel in the first infrared image with a maximum temperature in the first infrared image;

utilizing by the processing unit a second number of pixels less than the first number of pixels to determine a temperature interval for the first infrared image equal to a difference between the maximum temperature in the first infrared image and a threshold temperature in the first infrared image;

sorting by the processing unit the pixels in the infrared image in descending order of temperature from the maximum temperature and determining the threshold temperature in the first infrared image as a temperature of a pixel in the first infrared image that is the pixel placed a set number in the sorted order of pixels in the descending order of temperature from the maximum temperature, and wherein the set number is equal to the second number of pixels;

determining by the processing unit that a hot spot exists in the switchgear, wherein the determining that the hot spot exists comprises utilizing the temperature interval for the first infrared image; and outputting by an output unit an indication of a fault in the switchgear when the determination has been made that a hot spot exists in the switchgear.

According to another aspect, there is provided a computer program element controlling one or more of the systems as previously described which, if the computer program element is executed by a processor, is adapted to perform the methods as previously described.

According to another aspect, there is provided a computer readable medium having stored a computer element as previously described.

The computer program element can for example be a software program but can also be a FPGA, a PLD or any other appropriate digital means.

The above aspects and examples will become apparent from and be elucidated with reference to the embodiments described hereinafter.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for monitoring a switchgear, comprising:

an infrared camera configured to acquire a first infrared image of the switchgear, and wherein a total number of pixels in the first infrared image is equal to a first number;

a processing unit configured to determine a pixel in the first infrared image with a maximum temperature in the first infrared image; and an output unit configured to utilize a second number of pixels that is less than the first number of pixels to determine a temperature interval for the first infrared image, the temperature interval being equal to a difference between the maximum temperature in the first infrared image and a threshold temperature in the first infrared image;

wherein the processing unit is further configured to sort the pixels in the infrared image in descending order of temperature from the maximum temperature and determine the threshold temperature in the first infrared image as a temperature of a pixel in the first infrared image that is a pixel placed a set number in the sorted order of pixels in the descending order of temperature from the maximum temperature, and wherein the set number is equal to the second number of pixels;

wherein the processing unit is further configured to determine that a hot spot exists in the switchgear based on, at least in part, utilization of the temperature interval for the first infrared image; and wherein the output unit is further configured to output an indication of a fault in the switchgear when the determination has been made that a hot spot exists in the switchgear.

2. The system according to claim 1, wherein the second number is a predetermined number.

3. The system according to claim 1, wherein the second number is determined from one or more calibration infrared images of the, or a similar, switchgear.

4. The system according to claim 1, wherein the determination that the hot spot exists comprises utilization of the maximum temperature in the first infrared image.

5. The system according to claim 1, wherein the determination that the hot spot exists comprises a determination that the temperature interval for the first infrared image is greater than a threshold temperature interval value.

6. The system according to claim 5, wherein the threshold temperature interval value is determined as a function of the maximum temperature in the first infrared image.

7. The system according to claim 1, wherein the infrared camera is configured to acquire a second infrared image of the switchgear after acquisition of the first infrared image of the switchgear, wherein a total number of pixels in the second infrared image is equal to the first number, wherein the processing unit is configured to determine a pixel in the second infrared image with a maximum temperature in the second infrared image, wherein the processing unit is configured to utilize the second number of pixels to determine a temperature interval for the second infrared image equal to a difference between the maximum temperature in the second infrared image and a threshold temperature in the second infrared image, wherein the processing unit is configured to sort the pixels in the second infrared image in descending order of temperature from the maximum temperature in the second infrared image and determine the threshold temperature in the second infrared image as a temperature of a pixel in the second infrared image that is the pixel placed the set number in the sorted order of pixels in the descending order of temperature from the maximum temperature, and wherein the processing unit is configured to determine that the hot spot exists in the switchgear on the basis that the temperature interval for the second infrared image is greater than the temperature interval for the first infrared image.

8. The system according to claim 1, wherein the infrared camera is configured to acquire a plurality infrared images of the switchgear after acquisition of the first infrared image of the switchgear, wherein a total number of pixels in each of the plurality of infrared images is equal to the first number, wherein the processing unit is configured to determine a pixel in each of plurality of infrareds image with a maximum temperature in the each of the plurality of infrared images, wherein the processing unit is configured to utilize the second number of pixels to determine a temperature interval for each of the plurality of infrared images equal to a difference between the maximum temperature in the each of the plurality of infrared images and a threshold temperature in each of the plurality of infrared images, wherein the processing unit is configured to sort the pixels in each of the plurality of infrared images in descending order of temperature from the maximum temperature in each of the plurality of infrared images and determine the threshold temperature in each of the plurality of infrared images as a temperature of a pixel in each of the plurality of infrared images that is the pixel placed the set number in the sorted order of pixels in the descending order of temperature from the maximum temperature, wherein the processing unit is configured to determine that the hot spot exists in the switchgear on the basis of a rate of change between adjacent temperature intervals of the temperature interval for the first infrared image and the temperature intervals for the plurality of infrared images.

9. The system according to claim 1, wherein the determination that the hot spot exists comprises utilization of a machine learning algorithm.

10. The system according to claim 9, wherein the machine learning algorithm is a trained neural network.

11. The system according to claim 1, wherein the system comprises a visible camera configured to acquire a visible image of the switchgear, and wherein the processing unit is configured to overlay a location of a maximum temperature in an infrared image onto a corresponding location in the visible image.

12. The system according to claim 11, wherein the processing unit is configured to overlay locations of pixels having a temperature between a threshold temperature and the maximum temperature in an infrared image onto corresponding locations in the visible image.

13. A method for monitoring a switchgear, the method comprising:
   acquiring by an infrared camera a first infrared image of the switchgear, wherein a total number of pixels in the first infrared image is equal to a first number;
   determining by a processing unit a pixel in the first infrared image with a maximum temperature in the first infrared image;
   utilizing by the processing unit a second number of pixels less than the first number of pixels to determine a temperature interval for the first infrared image equal to a difference between the maximum temperature in the first infrared image and a threshold temperature in the first infrared image;
   sorting by the processing unit the pixels in the infrared image in descending order of temperature from the maximum temperature and determining the threshold temperature in the first infrared image as a temperature of a pixel in the first infrared image that is the pixel placed a set number in the sorted order of pixels in the descending order of temperature from the maximum temperature, and wherein the set number is equal to the second number of pixels;
   determining by the processing unit that a hot spot exists in the switchgear, wherein the determining that the hot spot exists comprises utilizing the temperature interval for the first infrared image; and
   outputting by an output unit an indication of a fault in the switchgear when the determination has been made that a hot spot exists in the switchgear.

14. The method according to claim 13, wherein the second number is a predetermined number.

15. The method according to claim 13, wherein the second number is determined from one or more calibration infrared images of the, or a similar, switchgear.

16. The method according to claim 13, wherein the determination that the hot spot exists comprises utilization of the maximum temperature in the first infrared image.

17. The method according to claim 13, wherein the determination that the hot spot exists comprises a determination that the temperature interval for the first infrared image is greater than a threshold temperature interval value.

18. The method according to claim 17, wherein the threshold temperature interval value is determined as a function of the maximum temperature in the first infrared image.

19. The method according to claim 13, wherein the determination that the hot spot exists comprises utilization of a machine learning algorithm, and wherein the machine learning algorithm is a trained neural network.

20. The method according to claim 13, wherein the method comprises using a visible camera configured to acquire a visible image of the switchgear, and wherein the processing unit is configured to overlay a location of a maximum temperature in an infrared image onto a corresponding location in the visible image.

* * * * *